June 7, 1966 H. B. WOLF 3,255,382
PROTECTING DEVICE FOR SERIES CAPACITOR CIRCUITS
Filed Jan. 29, 1963 3 Sheets-Sheet 3
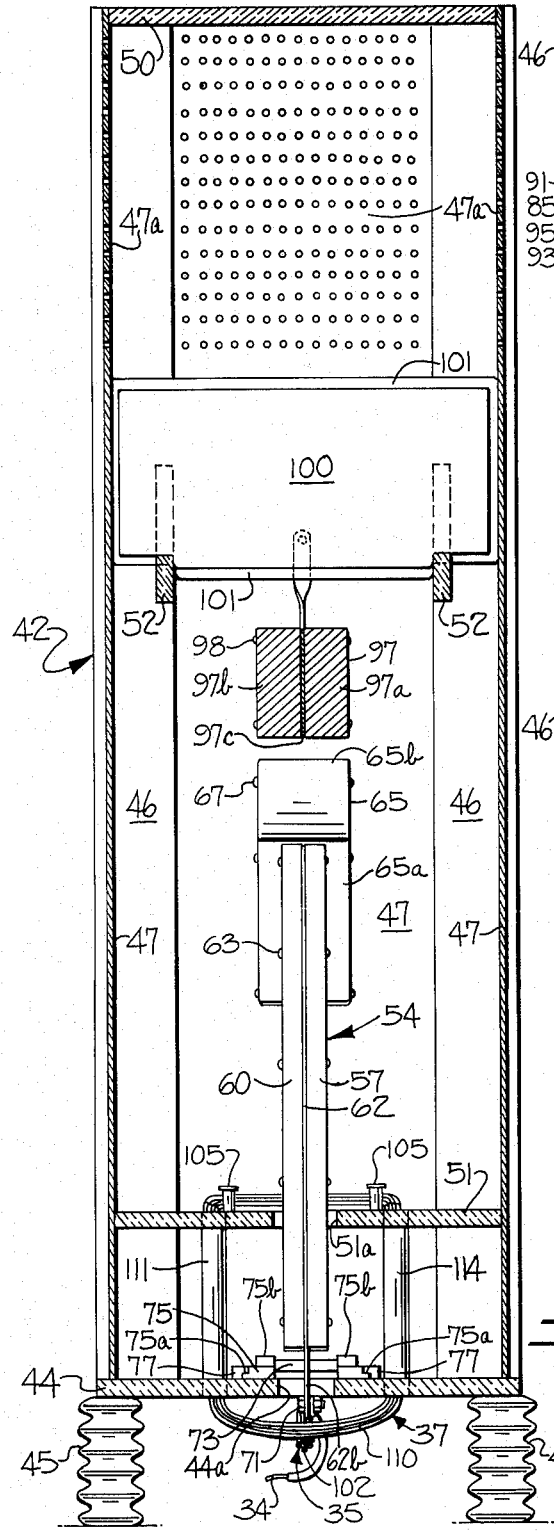
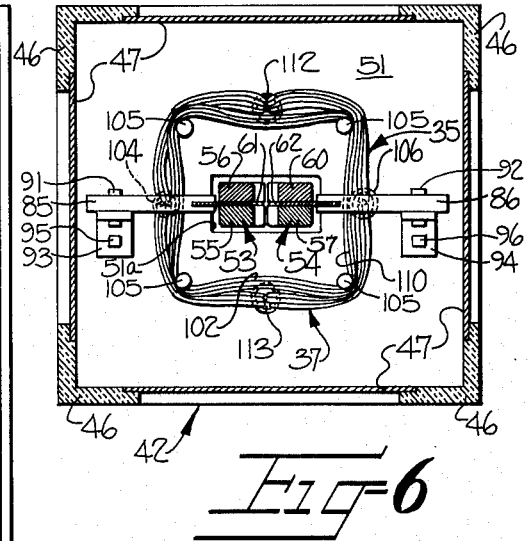
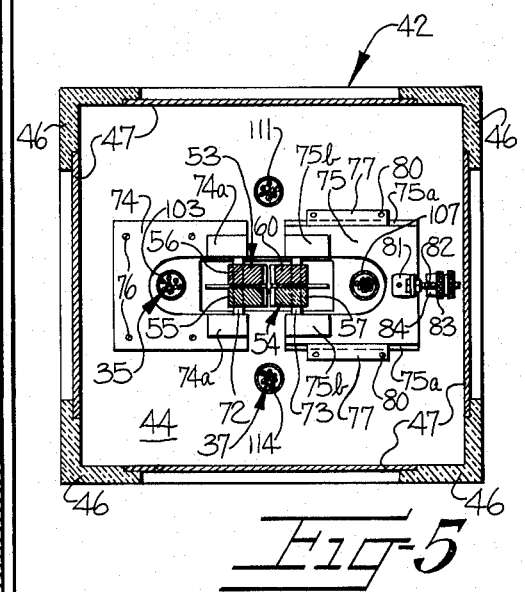
INVENTOR:
HERMAN B. WOLF
BY
Eaton, Bell, Hunt + Seltzer
ATTORNEYS United States Patent Office 3,255,382
Patented June 7, 1966

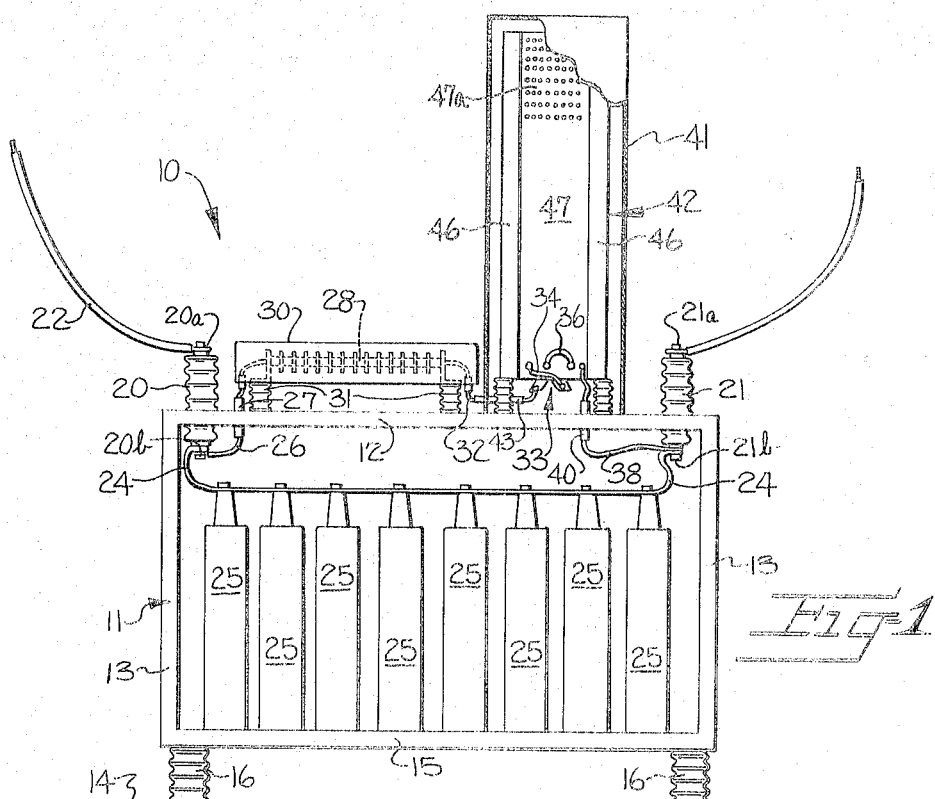
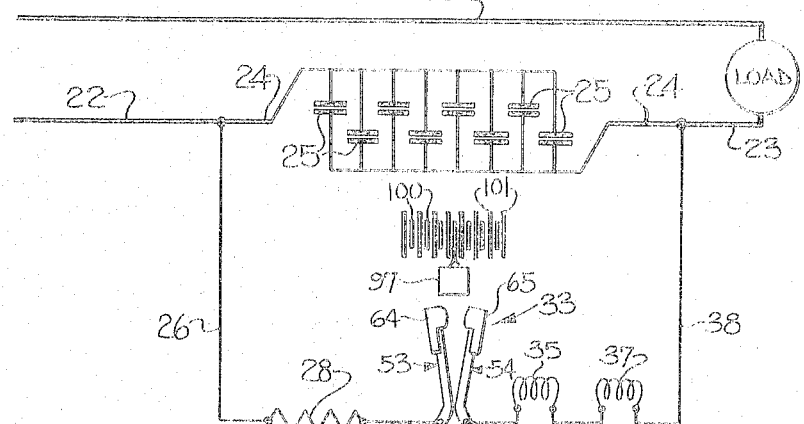

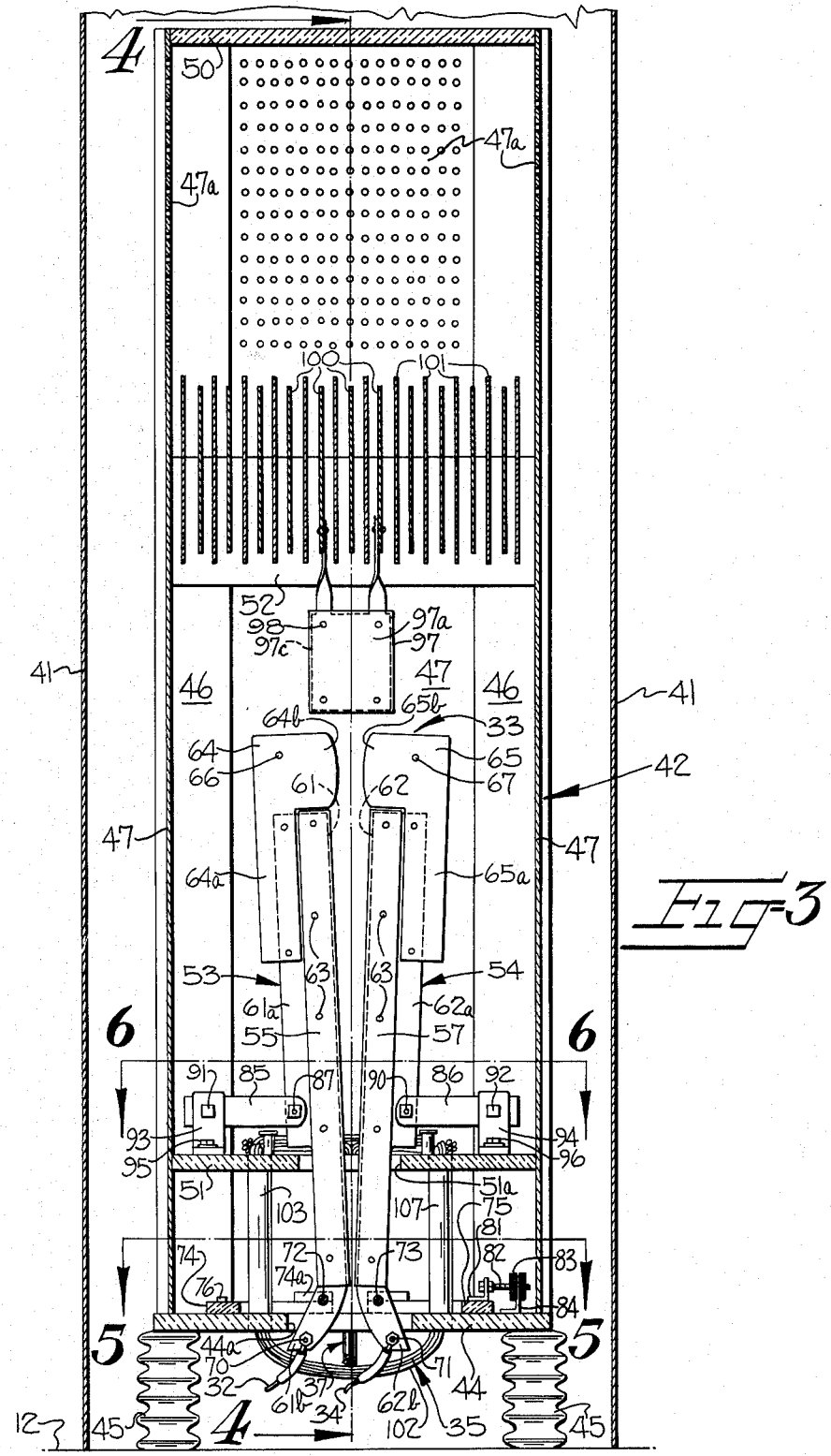

3,255,382
PROTECTING DEVICE FOR SERIES CAPACITOR CIRCUITS
Herman B. Wolf, Charlotte, N.C., assignor to R. H. Bouligny, Inc., Charlotte, N.C., a corporation of North Carolina
Filed Jan. 29, 1963, Ser. No. 254,626
11 Claims. (Cl. 317—12)

The present invention relates to electrical circuits having capacitors connected in series therein and more particularly to a protecting device for the capacitors in such an electrical circuit.

Such capacitors are well known in the electrical art and among other things, are used for power factor correction and voltage control of circuits; for increasing the capability of a circuit as a result a reduction of reactive current therein; for reducing momentary voltage drop, commonly referred to as "flicker," in the circuit due to a sudden application of an inductive load; and for controlling division of power flow in two or more parallel circuits by the application of the capacitors in one or more of the circuits.

A typical circuit in which such capacitors may be connected includes a main circuit connected to a source of power at a sub-station, generating station or transformer bank or the like. To protect both the source of power and the main circuit, a circuit interrupting device, such as a circuit breaker or fuse, is interposed between the main circuit and the source of power. Usually, this circuit interrupting device is actuated to open the main circuit in response to an increase in current above a predetermined value, hereinafter referred to as overcurrent, as might occur in the event of a short-circuit or overload on the main circuit.

A load is connected to the main circuit and may be a number of branch circuits, transformers, sub-stations, customer deliveries or the like. Each of the branch circuits, etc. may have a circuit interrupting device, such as a circuit breaker or fuse, between the same and the main circuit and these circuit interrupting devices are usually coordinated with the circuit interrupting device between the main circuit and the source of power so that a short-circuit or overload on a branch circuit, etc. will actuate the circuit interrupting device on that branch circuit, etc., and will not actuate the circuit interrupting device between the main circuit and the source of power. Therefore, this coordination permits continuous service to all of the branch circuits, etc., except the particular branch circuit, etc., in which a short-circuit or overload occurs. Also, the circuit interrupting device between the main circuit and the source of power therefor is actuated only when a short-circuit or overload occurs in the main circuit.

When capacitors are installed or connected in a main circuit between the source of power and the branch circuits, etc., a plurality or bank of the capacitors are usually connected in parallel to each other, but the bank of capacitors is connected in series with the load and therefore such capacitors are commonly referred to in the trade as "series capacitors." When so connected, the voltage appearing across the bank of capacitors is proportional to the current in the circuit. As is well known, standard capacitors have voltage limitations which when exceeded may damage or destroy the capacitors. Such capacitors are therefore quite vulnerable to damage when a fault or overload occurs in a branch circuit, etc., since the increased current in the main circuit as a result thereof causes a consequent voltage increase across the capacitors, which voltage increase will usually exceed the voltage limitations of the capacitors and will damage the same unless some protecting device is provided therefor.

Prior attempts have been made to provide a protecting device for such capacitors and the circuits in which the same are connected, but all of these prior attempts have been unsuccessful solution to the problem, however, since they are either very complex and expensive and hence unacceptable for economic reasons, or are limited to low capacity circuits and certain specific voltages. Another deficiency of such prior attempts is the very short effective life of some of these devices, which results in very high replacement and maintenance costs.

In main circuits, without a bank of capacitors, which are connected directly to a source of power of great capacity, it is often necessary or desirable to install current-limiting reactors to protect the main circuit from an excessive flow of current when a short-circuit or overload occurs on the main circuit. These current-limiting reactors, however, have the very undesirable characteristic of causing a voltage drop across the reactors during periods of normal circuit load, which causes a voltage reduction in the circuit during the normal load period. In addition, such current-limiting reactors are very expensive and are quite bulky, thereby causing space difficulties in the installation thereof.

It is therefore an object of the present invention to provide a protecting device for a bank of capacitors connected in a circuit which protecting device is extremely simple in construction and hence inexpensive to manufacture and maintain, and which will withstand repeated operation with no apparent reduction in effectiveness or reduction in the life thereof.

Another object of the present invention is to provide means for limiting fault or short-circuit current in a circuit which contains a bank of capacitors, which means is inserted in the circuit only during the appearance of the fault or short-circuit on the circuit and does not cause a voltage drop in the circuit during normal load conditions.

A more specific object of the present invention is to provide a protecting device for a bank of capacitors of the character described which shunts the capacitors upon and during the appearance of a short-circuit or overload on the circuit and automatically reinserts the capacitors in the circuit upon disappearance of the short-circuit or overload.

A still more specific object is to provide a protecting device for a bank of capacitors of the character described wherein a novel calibrated arc gap is provided which will withstand repeated arcings of fault current thereacross without a reduction in effectiveness, which is so constructed as to quickly and effectively extinguish the arc upon the fault or short-circuit being removed from the circuit, and wherein both lateral and upward elongation of an arc existing in the gap is controlled to reduce the energy being released therefrom.

Some of the ojects of the present invention having been stated, other objects will appear as the description proceeds, when taken in connection with the accompanying drawings, in which—

FIGURE 1 is a front elevational view of the apparatus of the protecting device of the present invention shown connected in shunting relation to a plurality of series capacitors connected in a main circuit;

FIGURE 2 is a schematic view of the installation shown in FIGURE 1;

FIGURE 3 is a vertical section taken through the housing shown in the upper portion of FIGURE 1 and showing the novel arc gap and associated structure of the present invention;

FIGURE 4 is a vertical section taken substantially along line 4—4 in FIGURE 3;

FIGURE 5 is a horizontal section taken substantially along line 5—5 in FIGURE 3; and FIGURE 6 is a horizontal section taken substantially along line 6—6 in FIGURE 3.

Referring now to the drawings, and more particularly to FIGURES 1 and 2, there is shown an installation generally indicated at 10 which incorporates the protective device of the present invention. Installation 10 includes a supporting frame 11 (FIGURE 1) which includes a top member 12 and leg members 13 which support the frame 11 on a suitable base or supporting surface 14. Frame 11 also includes a rack 15 which is supported on supporting surface 14 by insulators 16. It is noted that in low voltage installations, the insulators 16 may be omitted and rack 15 may be supported by any suitable means.

A pair of insulator connectors 20, 21 are mounted in suitable openings (not shown) in top member 12 at opposite ends thereof. Insulator connectors 20, 21 have terminals 20a, 20b and 21a, 21b, respectively, at opposite ends thereof. A line 22 is connected at one end to a suitable source of power (not shown) and is connected at its other end to terminal 20a of insulator connector 20. A line 23 is connected at one end to terminal 21a of insulator connector 21 and has a suitable load, indicated in FIGURE 2 by a circle with LOAD written therein, connected therein in any suitable manner and which may be any type load connectable in a series capacitor type circuit such as the branch circuits, transformers, substations, customer deliveries or the like discussed above. Line 23 is connected at its other end to the suitable source of power (not shown).

A line 24 is connected at its opposite ends to terminals 20b, 21b of insulator connectors 20, 21 and has a plurality or bank of capacitors 25 connected therein in parallel to each other but in series with the source of power and the load, which capacitors are mounted on and supported by rack 15 of frame 11. This completes the main capacitor circuit, except for suitable circuit breakers or fuses, etc. (not shown), which are to be connected therein in conventional manner. It is noted that for ease of illustration and description a single phase circuit has been shown and described, but it should be understood that the present invention is not restricted thereto and is equally applicable to polyphase installations or circuits.

An auxiliary or protective gap circuit is connected to the main circuit in shunting relation to capacitors 25 and includes a line 26 connected at one end to terminal 20b of insulator connector 20. Line 26 extends outwardly and upwardly from connector 20 through an insulator tube 27 mounted in a suitable opening in top member 12 and is connected at its other end to fault current limiting means, such as a resistor 28. Resistor 28 is preferably enclosed by a weatherproof housing 30 which is supported on top member 12 by suitable insulators 31.

In those circuits connected to a source of power of great capacity or in other circuits where it is necessary or desirable to limit the excessive flow of current upon the occurrence of a fault or short-circuit, resistor 28 may be of sufficient ohmic value to limit the current flowing through the auxiliary circuit and hence the main circuit to a predetermined desired value, which resistance would, of course, depend upon the specific voltage being impressed upon the main circuit. In those circuits where this current limiting feature is not desired, the ohmic value of resistor 28 may be reduced to a value which would not materially reduce the fault current but would afford some resistance in the protective gap circuit for obvious reasons.

A line 32 is connected at one end to the other end of resistor 28 and is connected at its other end to one side of an arc gap generally indicated at 33 to be described in more detail presently. A line 34 connects the other side of arc gap 33 to one end of an arc driving coil 35 and a line 36 connects arc driving coil 35 in series with an arc restraining coil 37. A line 38 connects arc restraining coil 37 to terminal 21b of insulator connector 21 to complete the auxiliary circuit in shunting relation to the series capacitors 25. Line 38 extends through an insulating tube 40 mounted in a suitable opening (not shown) in top member 12 intermediate its ends.

Arc gap 33 is preferably enclosed in a weatherproof outer housing 41 preferably constructed of metal or the like and an inner housing 42 (FIGURE 3) preferably constructed of insulating material. It is noted that line 32 extends through an insulator tube 43 mounted in a suitable opening in the side of the outer housing 41 such that the line is insulated therefrom. Inner housing 42 includes a base member 44 which is supported on top member 12 by suitable insulators 45 to insulate the same therefrom.

Inner housing 42 also includes four angle corner members 46 (FIGURES 5 and 6) mounted on base member 44 and which are undercut at opposite sides thereof to form grooves for reception of wall members 47 which are mounted therein. It is noted that at least the wall member 47 defining the front of inner housing 42 is slidably mounted in the grooves of the corresponding corner members 46 such that the same may be readily removed to provide access to the interior of inner housing 42. Also, each of the wall members 47 has a perforated portion 47a (FIGURES 3 and 4) adjacent the top thereof which includes a large number of perforations ventilating the inner housing 42. It is noted that the outer housing 41 is vented to the atmosphere in a manner not shown. A top member 50 closes the top of inner housing 42 and an intermediate member 51 is mounted a predetermined distance above base member 44 and divides the interior thereof into upper and lower sections with the lower section being many times smaller than the upper section. In addition, a pair of spaced mounting bars 52 are mounted in the upper sections of inner housing 42 for reasons to be presently described.

Arc gap 33 comprises a cooperating pair of elongate substantially vertically disposed electrodes 53, 54 (FIGURE 3) disposed in upwardly diverging relation and defining an arc chute therebetween. The lower end portions of electrodes 53, 54 are spaced a predetermined distance apart and define an arc-over point or spark gap at the lower end of the arc chute. Electrodes 53 and 54 comprise a pair of elongate carbon members 55, 56 and 57, 60, respectively (FIGURES 3-6), disposed on opposite sides of a thin elongate metallic member 61, 62, respectively. The opposing adjacent edges of the elongate carbon members 55, 56 and 57, 60 define the forward edges of electrodes 53, 54 and hence the opposite sides of the arc chute. It is noted that metallic members 61, 62 are disposed edgewise to each other and to the arc chute and the opposing adjacent edges thereof are spaced a predetermined greater distance apart than the adjacent opposing edges of the carbon members of electrodes 53, 54 such that the forward edges thereof are recessed a predetermined distance from the forward edges of the corresponding carbon members.

Carbon members 55, 56 and 57, 60 are held in sandwiching relation to metallic members 61, 62, respectively, by bolts or rivets 63 and metallic members 61, 62 have portions 61a, 62a extending rearwardly from the rear edges thereof. Generally, inverted L-shaped carbon blocks 64, 65 have the vertical legs 64a, 65a (FIGURE 3) split and disposed in straddling relation to portions 61a, 62a of metallic members 61, 62, respectively. Blocks 64, 65 are mounted on these portions of metallic members 61, 62 by bolts or rivets 66, 67, respectively. The horizontal legs 64b, 65b of carbon blocks 64, 65 are disposed in overlying relation to the upper ends of carbon members 55, 56 and 57, 60 and metallic members 61, 62 and are substantially rectangular in cross-section. Horizontal legs 64b, 65b of carbon blocks 64, 65 are of considerably greater cross-sectional area than carbon members 55, 56 or 57, 60 and have the opposing adjacent faces of said horizontal legs 64b, 65b convexly curved with the corners rounded to prevent chipping by an arc existing therebetween. Horizontal legs 64b, 65b define the upper end of the arc chute and serve to hold an arc therebetween until a circuit breaker or the like (not shown) connected in the main circuit can open to remove the fault appearing thereon. It is noted that these horizontal legs of blocks 64, 65 are of sufficient mass to withstand such an arc without burning.

The metallic members 61 and 62 have portions 61b, 62b extending downwardly below the lower end of carbon members 55, 56 and 57, 60 and which portions are disposed in diverging relation to each other and penetrate through an opening 44a formed in base member 44. Each of the portions 61b, 62b has a pair of openings therein which receive bolts 70, 71, respectively, for connecting lines 32, 34 to metallic members 61, 62 and hence to electrodes 53, 54 and pins 72, 73, respectively, which penetrate therethrough.

Pins 72, 73 penetrate into suitable openings in a pair of generally U-shaped mounting members 74, 75 (FIGURE 5). Mounting member 74 is stationarily mounted on base member 44 of inner housing 42 by suitable bolts or screws 76 and includes blocks 74a adjacent the ends of the legs thereof to cooperate with such legs to define bearings for opposite ends of pin 72 which mounts electrode 53 thereon.

Mounting member 75 is slidably mounted on base member 44 for movement toward and away from mounting member 74 by inverted L-shaped track members 77 (FIGURE 4) which are mounted on base member 44 by bolts or rivets 80 and receive undercut portions 75a beneath the horizontal legs thereof. Mounting member 75 has a bracket 81 mounted thereon in which is mounted one end of an adjusting screw or bolt 82. The other end portion of bolt 82 is disposed in a nut 83 mounted for rotation, but held against lateral movement by a bracket 84 which in turn, is stationarily mounted on base member 44 (FIGURE 3). Mounting member 75 likewise includes blocks 75b (FIGURE 5) adjacent the ends of the legs thereof which cooperate with such legs to define bearings for opposite ends of pin 73 which mounts electrode 54 thereon for adjustment relative to electrode 53.

Electrodes 53, 54 penetrate through an opening 51a formed in intermediate member 51 and are mounted on intermediate member 51 by a pair of mounting arms 85, 86 (FIGURES 3 and 6) having one end thereof connected to portions 61a, 62a of metallic members 61, 62 by suitable bolts 87, 90, respectively. The opposite ends of mounting arms 85, 86 are suitably slotted and have bolts 91, 92 penetrating therethrough. Bolts 91, 92 are mounted in a pair of brackets 93, 94 mounted on the upper surface of intermediate member 51 by bolts 95, 96. The degree of divergence of electrodes 53, 54 may therefore be adjusted.

An intermediate electrode 97 (FIGURES 3 and 4) is positioned above blocks 64, 65 and hence above the upper end of the arc chute defined by electrodes 53, 54. Electrode 97 preferably comprises a pair of carbon members 97a, 97b between which a metallic plate 97c is mounted and which are held in assembled relation by rivets or bolts 98. The metallic plate member 97c extends upwardly from the carbon members 97a, 97b and has the central portion thereof cut away with the remaining portions having a one-half turn twist imparted thereto. The upper end portions of these remaining portions are connected to two of a series of spaced metallic, preferably copper, plates 100 which are mounted on supportnig arms 52 above electrodes 53, 54. The spaced metallic plates 100 are preferably separated from each other by insulating plates 101 of suitable fibrous material which are disposed between the metallic members 100 and which are likewise supported by supported arms 52. It is noted that metallic plates 100 and insulating plates 101 serve as a flame quenching or muffling and gas deionizing device for an arc existing between electrodes 53, 54 by cooling flames and ionized gases rising upwardly by convection from such an arc.

As stated previously, arc driving coil 35 is connected in series with arc gap 33 and comprises a plurality of turns 102 (FIGURES 3–6) of insulated wire of appropriate size, which turns extend upward through an opening (not shown) in base member 44 and then penetrate longitudinal through a vertically disposed tubular member 103 (FIGURES 3 and 5) of insulating material. Tubular member 103 extends between base member 44 and intermediate member 51 and is disposed behind electrode 53 or on the opposite side thereof from electrode 54. Turns 102 then extend through an opening 104 (FIGURE 6) in intermediate member 51 and divide above intermediate member 51. Turns 102 extend around on opposite sides of arc gap 33 and converge at a point behind electrode 54 or on the opposite side thereof from electrode 53 and are held away from electrodes 53, 54 by pins or spindles 105 (FIGURES 3 and 6) mounted on intermediate member 51.

Turns 102 then extend downwardly through an opening 106 formed in intermediate member 51, through a second insulating tubular member 107, and through an opening (not shown) formed in base member 44 and then across beneath base member 44 to the first described opening therein beneath insulating tubular member 103.

The last turn 102 of arc driving coil 35 is connected by line 36 (FIGURES 1 and 2) to the first of a plurality of turns 110 (FIGURES 3–6) of insulating wire forming the arc restraining coil 37. Turns 110 extend upwardly through an opening (not shown) in base member 44, through an insulating tubular member 111 (FIGURES 4 and 5) and through an opening 112 (FIGURE 6) formed in intermediate member 51. Tubular member 111 is disposed on one side of the arc chute defined by electrodes 53, 54 and extends between base member 44 and intermediate member 51.

Turns 110 divide above intermediate member 51 and extend around pins 105 to the other side of the arc chute. Turns 110 then extend downwardly through an opening 113 in intermediate member 51, through an insulating tubular member 114, through an opening (not shown) in base member 44 and then across beneath base member 44 to the opening therein beneath tubular member 111. The last turn 110 of arc restraining coil 37 is connected to line 38 (FIGURES 1 and 2) which completes the auxiliary shunting circuit for the capacitors 25.

In operation, when increased fault or current flows in the main circuit in which the capacitors 25 are connected due to a short-circuit or overload occurring in a branch circuit, etc., the voltage across capacitors 25 will accordingly increase. When this voltage increase reaches a predetermined point, which point may be varied by suitable adjustment of the lower portion of electrodes 53 and 54 by means of the slidably mounted supporting member 75, an arc is established between the electrodes 53 and 54 at the arc-over point which is defined by the lower ends of the elongate carbon members 55, 56 and 57, 60.

It is noted that since the metallic members 61 and 62 have the edges thereof adjacent the arc chute recessed a predetermined distance from the edges of the elongate carbon members on opposite sides thereof, the arc occurs between the elongate carbon members of electrodes 53 and 54 and not between the metallic members 61, 62 thereof. Therefore, the metallic members 61, 62 are not burned at the arc-over point and the effective life of the electrodes 53 and 54 is materially increased.

With the establishment of an arc between electrodes 53 and 54, the auxiliary circuit in shunting relation to the capacitors 25 is completed and the resistor 28 is included in the main circuit in which the capacitors 25 are connected. The resistor 28 functions to limit the current which may flow in the auxiliary circuit and a portion of the fault current flowing in the main circuit flows through the auxiliary circuit thereby materially decreasing the current which flows through the capacitors 25 and hence materially decreasing the voltage increase across the capacitors.

As is well known, the arc existing between electrodes 53, 54 gives off considerable energy in the form of heat and the arc will be moved upwardly in the arc chute by convection which will length the path of the arc due to the upwardly diverging relationship of electrodes 53, 54. This upward movement of the arc by convection is not at a sufficiently rapid rate however to prevent the lower portion of electrodes 53, 54 from being burned thereby. To effect this sufficiently rapid upward movement of the arc, current flows through the arc driving coil 35 upon the existance of an arc between electrodes 53 and 54 which creates a magnetic field around the turns 102 thereof disposed in the tubular members 103 and 107. This magnetic field co-acts with the magnetic field surrounding the arc to move the arc upwardly in the arc chute at a very rapid rate.

At the same time, current flows in the arc restraining coil 37 and a magnetic field is formed around the turns 110 thereof disposed in insulating tubular members 111 and 114. However, as long as the arc passes directly across the arc chute between electrodes 53 and 54, this magnetic field around the turns 110 of coil 37 will have no effect thereon, but as soon as the arc attempts to elongate laterally out of the arc chute, this magnetic field will co-act with the magnetic field therearound to move the arc back into the arc chute and thereby constitutes means for limiting lateral elongation of the arc out of the arc chute.

When the arc passes upwardly beyond intermediate member 51 and the uppermost portion of the arc driving coil 35, the width of the arc chute at this point is sufficient such that burning will not result on the electrodes 53 and 54 and the arc may then be permitted to rise solely by the action of convection. When the arc reaches the horizontal legs 64b, 65b of blocks 64 and 65, the same is retained therebetween and undue upward elongation thereof is prevented by auxiliary electrode 97. It is noted that an arc existing between the blocks 64 and 65 passes from the horizontal leg 64b of block 64 upwardly to the auxiliary electrode 97 and then downwardly to the horizontal leg 65b of block 65.

Since the energy being given off by the arc is the product of the current flowing therein and the voltage drop across the arc which is proportional to the resistance of the arc, electrode 92 constitutes means for controlling the energy being released by an arc existing between electrodes 53, 54 since the length of such an arc and hence the arc resistance is limited thereby. Also, it is highly undesirable to have the flames and ionized gases released or caused by the arc escape into the area surrounding the protective device, and therefore, the metallic plates 100 and insulating plates 101 are positioned above electrodes 53 and 54 and serve to cool such flames and to de-ionize such gases. The de-ionized gases and cooled air then pass outwardly through the perforated portions 47a of the inner housing 42.

It is noted that the arc is moved upwardly in the arc chute at such a rapid rate that there is only a slight rise in temperature in the lower portions of electrodes 53, 54 and substantially no ionization of gases in the lower portion of the arc chute even with the passage therebetween of very large fault current, over 1000 amperes for example. Also, while the arc occurs between carbon surfaces since metallic members 61, 62 have the edges thereof adjacent the arc chute recessed from the corresponding edges of carbon members 55, 56 and 57, 60, the current in each electrode passes through only a very short carbon path, i.e., the predetermined distance the edges of metallic members are recessed from the edges of the carbon members which is preferably about 1/16 of an inch since the metallic members 61, 62 have a lower resistance than the carbon members 55, 56 and 57, 60 and therefore the highly undesirable negative coefficient of resistance characteristic of a solid carbon electrode is eliminated. Also, for this reason, the carbon members 55, 56 and 57, 60 do not pass the current from bottom to top or to carbon block 64 and then from top of carbon block 65 to bottom, but the larger portion thereof passes through the metallic members 61, 62 and consequently there is only a very slight rise in temperature.

The arc is maintained between carbon blocks 64, 65 until the increased current due to the fault is interrupted for any numerous reasons, such as the opening of a circuit breaker in a branch circuit, etc., for example. When this occurs, the current passing through the main circuit is reduced to normal load current and hence the arc current between electrodes 53, 54 is reduced to less than normal load current as a portion of this load current is being supplied through the auxiliary circuit and resistor 28 and a portion of the normal load current passes through capacitors 25. Since the impedance in the auxiliary circuit increases rapidly after the interruption of the increased or fault current, the arc between electrodes 53, 54 breaks very quickly, usually in ½ cycle to 5 cycles, after such interruption. Since there has been only a very slight rise in temperature in electrodes 53, 54 and substantially no ionization in the arc chute, there is no re-strike of an arc at the arc-over point under normal voltage conditions.

It will therefore be apparent that an extremely simple and effective protecting device for a bank of capacitors is provided which will withstand repeated occurrences of faults on the main circuit with no apparent reduction in effectiveness and which is capable of protecting series capacitors in circuits of any capacity.

In the drawings and specification there has been set forth a preferred embodiment of the invention and, although specific terms are employed, they are used in a generic and descriptive sense only and not for purposes of limitation, the scope of the invention being defined in the claims.

I claim:

1. In a main electric circuit having a bank of capacitors connected therein, the combination of means for protecting such capacitors from damage due to overload when a fault appears on said circuit, said means comprising
  (a) fault current limiting means,
  (b) an auxiliary circuit connecting said fault current limiting means in said main circuit in shunting relation to said capacitors,
  (c) means interposed in said auxiliary circuit for normally maintaining said auxiliary circuit open and responsive to overload due to the appearance of a fault on said main circuit for completing said auxiliary circuit to place said fault current limiting means in said main circuit for shunting said capacitors, said means comprising first and second spaced elongate upwardly diverging electrodes defining an arc chute therebetween with the lower portions of the electrodes positioned a predetermined distance apart to define an arc-overpoint at the lower end of said arc chute and the upper portions of said electrodes being positioned so as to maintain the arc therebetween until the main circuit is opened or the fault is removed therefrom, and
  (d) coil means disposed adjacent the lower portions of said electrodes and connected in series therewith for generating an electromagnetic field around the lower portion of said electrodes upon the existence of an arc therebetween for limiting lateral elongation of the arc to thereby maintain the arc in a substantially direct path between said electrodes.

2. The structure set forth in claim 1 wherein said protecting means includes
  (e) third electrode means disposed adjacent the upper portions of said first and second electrodes for limiting upward elongation of an arc existing between said first and second electrodes to thereby limit the energy released by such an arc and to aid in maintaining the arc between the electrodes until the main circuit is opened or the fault is removed therefrom.

3. The structure set forth in claim 1 wherein each of said first and second electrodes comprises
   (1) a thin elongate metallic member disposed edgewise relative to the other electrode,
   (2) a pair of elongate carbon members disposed one on each side of said metallic member and having said metallic member sandwiched therebetween, said carbon members extending for substantially the full length of said metallic member and extending outwardly toward the other electrode a predetermined distance from said metallic member whereby the edge of said metallic member adjacent the arc chute is recessed a predetermined distance from the corresponding edges of said carbon members, and
   (3) a carbon block positioned on the upper end of said metallic member and being of greater cross-sectional area than the combined carbon and metallic members.

4. In a main electric circuit having a bank of connected capacitors connected therein, the combination of means for protecting said capacitors from damage due to overload when a fault appears on said main circuit, said means comprising
   (a) fault current limiting means,
   (b) an auxiliary circuit connecting said fault current limiting means in said main circuit in shunting relation to said capacitors,
   (c) a pair of elongate upwardly diverging electrodes connected in said auxiliary circuit and normally maintaining said auxiliary circuit open, said electrodes being responsive to overload due to the appearance of a fault on said main circuit for completing said auxiliary circuit by an arc established between said electrodes,
   (d) coil means disposed adjacent the lower portion of said electrodes and connected in series therewith for generating a magnetic field around the lower portion of said electrodes upon the establishment of an arc between the electrodes for controlling lateral elongation of the arc existing therebetween to maintain the arc in a substantially direct path between said electrodes, and
   (e) a third electrode disposed adjacent the upper ends of said electrodes for controlling upward elongation of an arc existing between said electrodes to thereby control the energy being released by such an arc and to aid in maintaining the arc between the electrodes until the main circuit is opened or the fault is removed.

5. The structure recited in claim 4 wherein said coil means (d) for controlling lateral elongation of an arc comprises an arc restraining coil interposed in said auxiliary circuit and including a plurality of turns arranged relative to said lower portion of said electrodes for creating a magnetic field laterally of said electrodes upon current flow therein, such magnetic field of said coil coacting with the magnetic field of the arc to maintain the arc in a substantially direct path between the electrodes.

6. In a main electric circuit having a bank of capacitors connected therein, the combination of means for protecting said capacitors from damage due to overload when a fault appears on said main circuit, said means comprising
   (a) fault current limiting means,
   (b) an auxiliary circuit connecting said fault current limiting means in said main circuit in shunting relation to said capacitors,
   (c) first and second elongate upwardly diverging electrodes interposed in said auxiliary circuit and normally maintaining said auxiliary circuit open and responsive to over-voltage due to the appearance of a fault on said main circuit for completing said auxiliary circuit by an arc established between said electrodes,
   (d) an arc driving coil interposed in said auxiliary circuit and arranged relative to the lower portion of said electrodes for creating a magnetic field upon current flow in said arc driving coil for coaction with the magnetic field of an arc existing between said electrodes for moving the arc upwardly along a predetermined portion of said arc chute,
   (e) an arc restraining coil interposed in said auxiliary circuit and arranged relative to said lower portion of said electrodes for creating a magnetic field upon current flow in said arc restraining coil for coaction with the magnetic field around the arc existing between said electrodes for controlling lateral elongation of the arc to thereby maintain the arc within the arc chute,
   (f) an auxiliary electrode disposed adjacent to said first and second electrodes and in the path of upward elongation of an arc existing therebetween for controlling the upward elongation of the arc and thereby controlling the energy being released by such an arc and for aiding in maintaining the arc between the electrodes until the main circuit is opened or the fault is removed, and
   (g) means disposed above said auxiliary electrode for cooling ionized gases and quenching flames resulting from the arc existing between said electrodes.

7. The structure set forth in claim 6 wherein each of said first and second electrodes comprises
   (1) a thin elongate metallic member disposed edgewise relative to the other electrode,
   (2) a pair of elongate carbon members disposed one on each side of said metallic member and having said metallic member sandwiched therebetween, said carbon members extending for substantially the full length of said metallic member and extending outwardly toward the other electrode a predetermined distance from said metallic member whereby the edge of said metallic member adjacent the arc chute is recessed a predetermined distance from the corresponding edges of said carbon members, and
   (3) a carbon block positioned on the upper end of said metallic member and being of greater cross-sectional area than the combined carbon and metallic members.

8. In a main electric circuit having a bank of capacitors connected therein, the combination of means for protecting said capacitors from damage due to overload when a fault appears on said main circuit, said means including an auxiliary circuit connected in said main circuit in shunting relation to said capacitors, said auxiliary circuit including an arc gap connected in said auxiliary circuit and normally maintaining said auxiliary circuit open during normal load conditions in said main circuit and responsive to over-voltage due to increased fault current upon the appearance of a fault on said main circuit for completing said auxiliary circuit for shunting a portion of the fault current around said capacitors, said arc gap comprising first and second spaced elongate electrodes disposed in upwardly diverging relation to define an arc chute with the lower end portions of the electrodes disposed a predetermined distance apart to define an arc-over point at the lower end of said arc chute, each of said electrodes comprising
   (a) a thin elongate metallic member disposed edgewise relative to the other electrode,
   (b) a pair of elongate carbon members disposed one on each side of said metallic member and having said metallic member sandwiched therebetween, said carbon members extending for substantially the full length of said metallic member and extending outwardly toward the other electrode a predetermined distance from said metallic member whereby the edge of said metallic member adjacent the arc chute is recessed a predetermined distance from the corresponding edges of said carbon members, and
(c) a carbon block positioned on the upper end of said metallic member and being of greater cross-sectional area than the combined carbon and metallic members to resist the burning effect of an arc existing therebetween, the carbon blocks at the upper end of said electrodes serving to retain an arc therebetween until the main circuit is opened or the fault is removed.

9. An arc gap for use in a protective device for a bank of capacitors comprising a pair of generally vertically disposed, elongate electrodes disposed in upwardly diverging relation to define an arc chute therebetween, the lower end portions of said electrodes being disposed at a predetermined distance apart to define an arc-over point at the lower end of said arc chute, said electrodes each comprising
   (a) a thin elongate metallic member disposed edgewise relative to the other electrode,
   (b) a pair of elongate carbon members disposed one on each side of said metallic member and having said metallic member sandwiched therebetween, said carbon members extending for substantially the full length of said metallic member and extending outwardly toward the other electrode a predetermined distance from said metallic member whereby the edge of said metallic member adjacent the arc chute is recessed a predetermined distance from the corresponding edges of said carbon members, and
   (c) a carbon block positioned on the upper end of said metallic member and being of greater cross-sectional area than the combined carbon and metallic members to withstand the burning effect of an arc existing therebetween.

10. The structure recited in claim 9 including
   (d) an auxiliary electrode disposed adjacent to said carbon blocks and in the path of upward elongation of an arc existing therebetween for controlling the upward elongation of the arc to thusly control the energy released by the arc.

11. An arc gap for use in a protecting device for a bank of capacitors comprising
   (a) a pair of elongate upwardly diverging electrodes defining an arc chute therebetween, the lower end portions of said electrodes being disposed at a predetermined distance apart to define an arc-over point at the lower end of said arc chute, said electrodes each comprising
      (1) a thin elongate metallic member disposed edgewise to the other electrode,
      (2) a pair of elongate carbon members disposed one on each side of said metallic member and having said metallic member sandwiched therebetween, said carbon members extending for substantially the full length of said metallic member and extending outwardly toward the other electrode a predetermined distance from said metallic member whereby the edge of said metallic member adjacent said arc chute is recessed a predetermined distance from the corresponding edges of said carbon members, and
      (3) a carbon block positioned on the upper end of said carbon and metallic members and having a greater cross-sectional area than said carbon and metallic members,
   (b) an auxiliary electrode disposed adjacent to said carbon blocks and substantially covering the upper end of said arc chute for controlling upward elongation of an arc existing between said pair of electrodes to thusly control the energy released by the arc, said auxiliary electrode comprising
      (1) a pair of substantially rectangular carbon members, and
      (2) a thin metallic member disposed between said carbon members in intimate relation thereto, and
   (c) a plurality of spaced alternating metallic and insulating members disposed above said auxiliary electrode for cooling ionized gases and quenching flames resulting from an arc existing between said electrodes.

References Cited by the Examiner

UNITED STATES PATENTS

| 1,398,982 | 12/1921 | Tritle | 200—147 |
| 1,533,251 | 4/1925 | Johnston | 200—147 |
| 2,953,666 | 9/1960 | Matthias | 200—144 X |

FOREIGN PATENTS

| 510,361 | 2/1955 | Canada. |
| 1,072,308 | 3/1954 | France. |

SAMUEL BERNSTEIN, *Primary Examiner.*

RAPHAEL V. LUPO, *Assistant Examiner.*